United States Patent
Geneste et al.

(10) Patent No.: US 8,136,765 B2
(45) Date of Patent: Mar. 20, 2012

(54) METHOD OF LAUNCHING INTO OPERATIONAL ORBIT AN ARTIFICIAL SATELLITE AND ASSOCIATED PROPULSION DEVICE

(75) Inventors: Jean-Francois Geneste, Toulouse (FR); Jean-Francois Poussin, Ramonville (FR)

(73) Assignee: Astrium SAS, Paris (FR)

( * ) Notice: Subject to any disclaimer, the term of this patent is extended or adjusted under 35 U.S.C. 154(b) by 568 days.

(21) Appl. No.: 12/306,592

(22) PCT Filed: Jun. 26, 2007

(86) PCT No.: PCT/FR2007/051516
§ 371 (c)(1),
(2), (4) Date: Dec. 24, 2008

(87) PCT Pub. No.: WO2008/001002
PCT Pub. Date: Jan. 3, 2008

(65) Prior Publication Data
US 2009/0230249 A1    Sep. 17, 2009

(30) Foreign Application Priority Data
Jun. 27, 2006    (FR) .................................... 06 05794

(51) Int. Cl.
*B64G 1/26*    (2006.01)

(52) U.S. Cl. .................... 244/158.5; 244/171.3
(58) Field of Classification Search .... 244/158.4–158.6, 244/169, 171.1, 171.3, 172.2, 172.3
See application file for complete search history.

(56) References Cited

U.S. PATENT DOCUMENTS

| | | | | | |
|---|---|---|---|---|---|
| 3,215,365 | A | * | 11/1965 | Dassoulas et al. | 244/169 |
| 3,369,771 | A | * | 2/1968 | Walley et al. | 244/159.3 |
| 4,471,926 | A | * | 9/1984 | Steel, III | 244/171.1 |
| 4,609,169 | A | * | 9/1986 | Schweickert et al. | 244/172.2 |
| 5,120,007 | A | * | 6/1992 | Pocha et al. | 244/158.4 |

(Continued)

FOREIGN PATENT DOCUMENTS
DE    19623017    1/1998
(Continued)

OTHER PUBLICATIONS

International Search Report for PCT application No. PCT/FR 2007/05156, report dated Oct. 26, 2007.
Search report of French Patent application No. FR 0605794, report dated Mar. 14, 2007.

*Primary Examiner* — Galen Barefoot
(74) *Attorney, Agent, or Firm* — Miller, Matthias & Hull, LLP

(57) ABSTRACT

A method is disclosed for placing a satellite in an operational orbit. The satellite is equipped with its own satellite propulsion system as well as a detachable separate propulsion device. The satellite and separate propulsion device are launched into a transfer orbit by means of a space launcher. The separate propulsion device is controlled by a satellite. The satellite is transferred from the transfer orbit to an intermediate orbit by means of the separate propulsion device. The separate propulsion device is separated from the satellite in the intermediate orbit. The satellite then enters and operational orbit from the intermediate orbit by means of its own satellite propulsion system. The intermediate orbit is disposed between the transfer and operational orbits, and is in relatively close proximity to the operational orbit but is far enough away from the operational orbit to prevent possible interferences.

10 Claims, 2 Drawing Sheets

U.S. PATENT DOCUMENTS

| | | | |
|---|---|---|---|
| 5,186,419 A * | 2/1993 | Scott | 244/171.3 |
| 5,651,515 A * | 7/1997 | Saccoccia et al. | 244/171.1 |
| 5,927,652 A * | 7/1999 | Lansard | 244/158.1 |
| 6,113,032 A | 9/2000 | Cochran et al. | |
| 6,182,928 B1 | 2/2001 | Wagner | |
| 6,193,193 B1 * | 2/2001 | Soranno et al. | 244/159.4 |
| 6,267,329 B1 * | 7/2001 | Chethik | 244/158.4 |
| 7,114,683 B2 | 10/2006 | Hall | |
| 2002/0179776 A1 | 12/2002 | Mueller et al. | |

FOREIGN PATENT DOCUMENTS

| | | |
|---|---|---|
| EP | 0947424 | 6/1999 |
| EP | 1313643 | 5/2003 |
| EP | 1492706 | 1/2005 |
| WO | WO 99/14118 | 3/1999 |
| WO | WO 2005/118394 | 12/2005 |

* cited by examiner

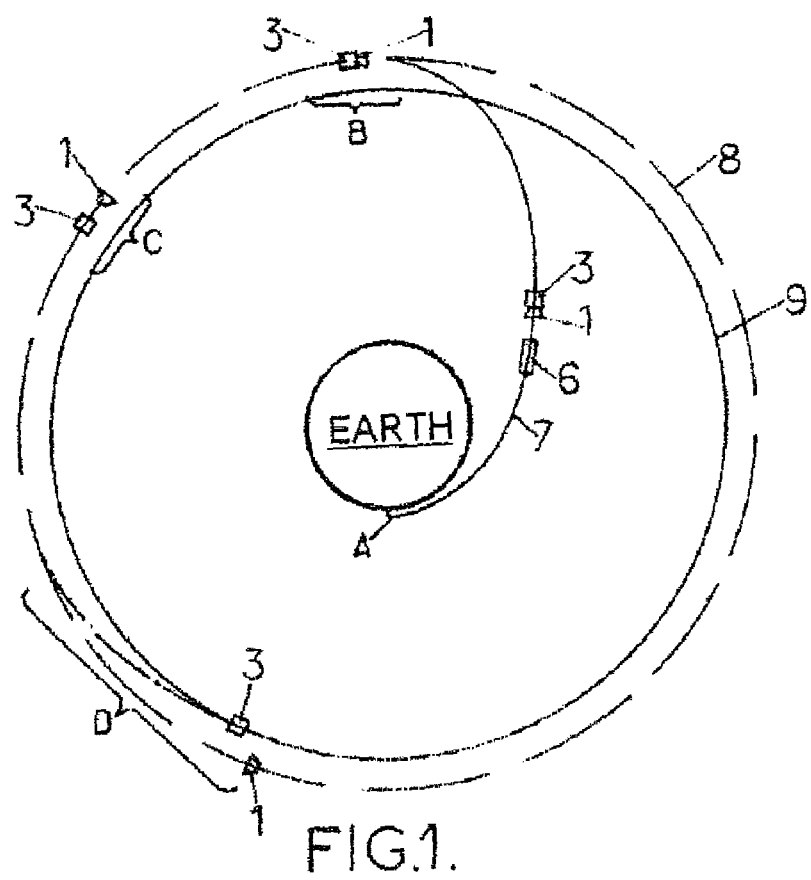
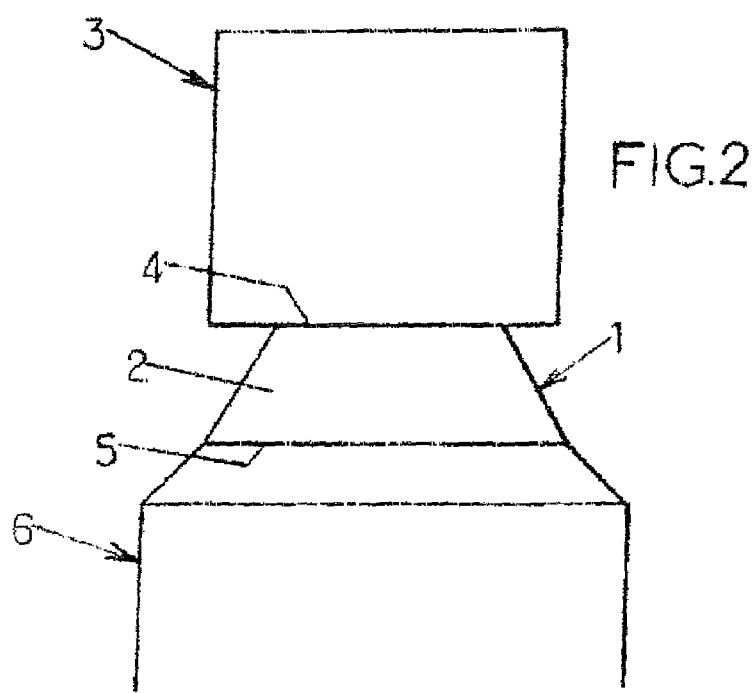

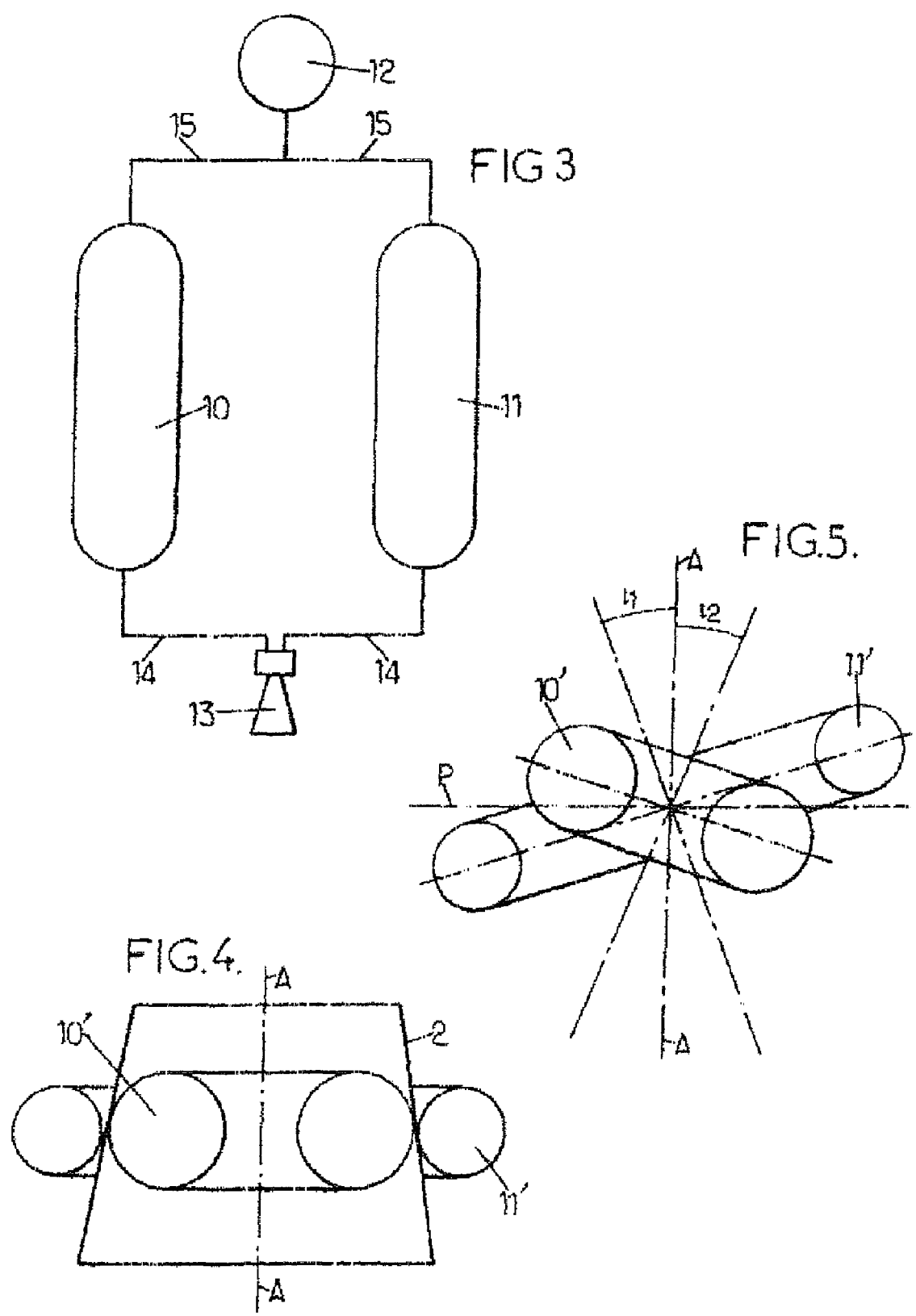

US 8,136,765 B2

METHOD OF LAUNCHING INTO OPERATIONAL ORBIT AN ARTIFICIAL SATELLITE AND ASSOCIATED PROPULSION DEVICE

CROSS-REFERENCE TO RELATED APPLICATIONS

This application is a U.S. national stage filing of International Patent Application No PCT/FR2007/051516 filed on Jun. 26, 2007, which claims priority under the Paris Convention to French Patent Application No 06 05794, filed on Jun. 27, 2006.

FIELD OF THE DISCLOSURE

This disclosure relates to a method of launching into operational orbit, and in particular geostationary orbit, an artificial satellite equipped with its own propulsion system, and this disclosure also relates to a propulsion device associated with the satellite for the launching into operational orbit of such satellite from a transfer orbit obtained by means of a space launcher.

BACKGROUND OF THE DISCLOSURE

The most common method of launching a satellite into geostationary orbit comprises a first stage, which is a stage of injection into a transfer orbit by a space launcher, followed, after separation of the launcher and the satellite, by a second stage, during which the satellite provides the rest of the necessary propulsion by means of its own propulsion system, to complete arrival in geostationary orbit.

Generally, around two-thirds of the propellants taken on by the satellite for its own propulsion system are consumed during this second stage, which is the launch stage, and only the remaining one-third of the propellants are used for station keeping and the actual mission of the satellite in geostationary orbit.

This method of launching was developed, particularly in the Western world, as until now it offered the best compromise between technology and economics, both for the launchers and the satellites, and in particular procured the best thrust efficiency for the launchers.

On the commercial market for satellite launches, the billing of launches essentially took into account the masses to be launched, until the launchers which were initially developed for military purposes were made available to the commercial market The arrival on the commercial market of such low cost-price launchers called into question this billing approach, by offering launch prices almost independent of the masses to be launched, and by providing the possibility of taking the satellites almost directly into geostationary orbit due to the fact that these new launchers have reignitable stages. In this case, the last stage, or upper stage, of the launcher can place the satellites) directly in an orbit close to the geostationary orbit and then, after separation of the satellites and this stage of the launcher, the latter, if one wishes to comply with international recommendations on space debris, should go into a so-called "graveyard" orbit, for example around 300 kilometres above the geostationary orbit, and be rendered passive so that no space debris is created. For its or their part, the satellite(s) reach the geostationary orbit by means of its or their own propulsion system(s).

However, this direct geostationary orbit injection method poses a number of problems.

In the event of a double or multiple launch, the structure carrying the satellites cannot be jettisoned in the geostationary orbit, which means that this carrying structure must be kept attached to the upper stage of the launcher to then be released at the same time as the launcher into the graveyard orbit. Furthermore, after the separation, in an orbit close to the geostationary orbit, of the satellites) and the upper stage of the launcher, the latter's thruster(s) must be reignited, at least once, for the upper stage of the launcher to reach the graveyard orbit. Moreover, if the upper stage of the launcher encounters a major problem in the orbit close to the geostationary orbit, the launcher upper stage can remain locked in that orbit or even explode and thus create debris dangerous to the geostationary satellites.

In order to avoid these drawbacks, WO 99/14118 proposes a method of launching into geostationary orbit an artificial satellite injected into this orbit by a space launcher, and such that:

the assembly formed by the last stage of the launcher and the satellite to be injected into the geostationary orbit is first sent directly into a circular orbit, known as the graveyard orbit, close to the geostationary orbit but far enough away from it to avoid any interference with space objects in the geostationary orbit, the satellite is separated from the last stage of the launcher, which remains in the graveyard orbit, and the satellite reaches the geostationary orbit from the graveyard orbit by means of its own propulsion system.

Thus, the launcher sends the satellite into the graveyard orbit, in which the upper stage of the launcher jettisons the satellite, which then reaches the geostationary orbit by its own means. As the upper stage of the launcher is directly in the graveyard orbit, it is no longer necessary to reignite its thrusters(s), and all that is required is to render it passive in the graveyard orbit, which is preferably at an altitude several tens to several hundreds of kilometres away from the geostationary orbit, and in particular around 300 kilometres away from the geostationary orbit.

However, this method nevertheless has the drawback of requiring the use of a more powerful launcher than those allowing for launches into geostationary orbit by the more conventional method comprising a first stage of injection of the satellite into a transfer orbit followed by a second stage during which the satellite reaches the geostationary orbit by means of its own propulsion system.

For reasons of security of supply of launchers, the commercial market requires of satellite manufacturers that their satellites be compatible with the main launchers available on the market, not all of which are currently capable of direct launching into geostationary orbit.

SUMMARY OF THE DISCLOSURE

The commercial constraint of the compatibility of satellites with such launchers therefore leads to the development of another method allowing a satellite to be placed in geostationary orbit from a transfer orbit, without however losing the advantages brought by a direct launch into geostationary orbit by the launcher, one of the most important of which is that the fuel saved on the satellite through direct launching into geostationary orbit frees up space in the satellite, so that the payload taken onboard can be increased, thus reducing the operating costs very significantly, ensuring greater competitiveness. This commercial constraint of compatibility of the satellites with several types of launcher also applies to orbits other than geostationary orbits, for example intermediate circular orbits, known as MEOS, such as those used by navigation constellation satellites (GPS or Galileo).

To this end, this disclosure proposes a method of launching into operational orbit a satellite, equipped with its own propulsion system, from a transfer orbit obtained by means of a space launcher, which is characterized in that it comprises at least the following stages:

a) a propulsion device controlled by the satellite is separably attached to the satellite, and the assembly formed by the satellite and the propulsion device is mounted on the launcher before injection of the assembly into the transfer orbit by the launcher, b) said assembly is conveyed, by means of the propulsion device, from the transfer orbit into an intermediate orbit between the transfer orbit and the operational orbit, the intermediate orbit being close to the operational orbit but sufficiently far away from it to avoid any interference with the operational orbit, c) the satellite is separated from the propulsion device, which remains in the intermediate orbit, and d) the satellite reaches the operational orbit from the intermediate orbit by means of its own propulsion system.

It is understood that the space launcher allows for the injection, in a manner known per se, of the assembly formed by the satellite and the propulsion device, into a transfer orbit, in which the separation of the last stage or upper stage of the launcher and the satellite and propulsion device assembly takes place, and from which the assembly is conveyed, mainly using the propellants of the propulsion device, into the intermediate orbit, close to but sufficiently far away from the operational orbit, and in which the propulsion device remains after its separation from the satellite, which satellite then reaches the operational orbit from the intermediate orbit by means of its own propulsion system.

This method has the advantage that the satellite's own propulsion system only needs to consume a small quantity of propellants to move from the intermediate orbit to the operational orbit, and that there is no need to reignite the thruster(s) of the propulsion device on the one hand and of the last stage of the launcher on the other hand, to convey them respectively to a graveyard orbit, as the propulsion device and the last stage of the launcher can remain respectively in the intermediate orbit and the transfer orbit.

Advantageously, the method also has one and/or more of the following characteristics:

the transition from the intermediate orbit to the operational orbit is carried out by means of one or more successive thrusts, delivered by the satellite's own propulsion system;

a stage of rendering the propulsion device passive in the intermediate orbit, before or after its separation from the satellite in order to avoid the creation of space debris by explosion;

the operational orbit is a geostationary orbit, and the intermediate orbit is a so-called graveyard orbit, at an altitude several tens to several hundreds of kilometres away from the geostationary orbit;

the operational orbit is a so-called MEO, at an altitude of around 20,000 km, and the intermediate orbit is a so-called graveyard orbit, at an altitude several tens to several hundreds of kilometres away from the MEO.

On a number of launchers on the market, the interface between the launcher (its upper stage or last stage) and the satellite is formed by means of an adapter, generally largely conical, the large and small bases of which are attached detachably to the launcher and the satellite respectively. This configuration applies to most launchers, to such an extent that the dimensions of the conical launcher-satellite interface adapter are standard. Also in most cases, the inside of the adapter is empty.

However, it has already been proposed in European Patents EP 1 313 643 B1 and EP 1 492 706 B1 that a largely conical adapter be equipped with various components. According to EP 1 313 643 B1, the adapter comprises at least two adapter sections detachably connected to each other, a first section being permanently fixed to the launcher, and the second section being detachably connected to the satellite and also comprising internal means of mounting equipment, including equipment for at least one autonomous or independent satellite, such as solar panels, propulsion systems, control systems and on-board computers, or even a load and/or autonomous satellites.

On separation from the launcher, the satellite fixed to the adapter is detached from the small basis of the latter, i.e. from the second section of the adapter, after which the two sections of the adapter detach from each other, and the second section of the adapter separates from the first, which remains connected to the launcher, the second section of the adapter becoming an autonomous space vehicle, with its own propulsion system, being able to launch into orbit at least one additional satellite or forming in itself such an additional satellite.

According to EP 1 492 706 B1, the largely conical adapter also comprises two sections. However, these two sections are designed to be coupled separately and detachably, a first to the launcher and the second to the satellite, before being permanently connected to each other, in operational configuration, means of propulsion and/or a payload being mounted in at least the first section of the adapter. As a result, the adapter can be separated from both the launcher and the satellite and is equipped to make an independent space flight. The adapter can therefore be used as an independent space vehicle, particularly deployable as a towing vehicle in space.

For normal missions, during which the launcher reaches the correct orbit, the satellite can first be detached from the adapter by a separation mechanism provided to this end in the coupling between the satellite and the adapter. Then, by means of a separation mechanism in the coupling between the adapter and the launcher, the adapter as an independent space craft can be detached from the launcher, and continue its flight independently of the launcher.

Under certain circumstances, in use, the adapter can first be separated from the launcher whilst the coupling to the satellite remains intact, which is important if the desired orbit has not been reached, for example due to incorrect functioning of the launcher. In this case, the adapter initially remains coupled to the satellite, and the adapter's means of propulsion can be used to carry out a recovery or orbit correction manoeuvre, so that the desired orbit for the satellite can nonetheless be reached. Then, the separation mechanism in the coupling between the adapter and the satellite can be activated, in order to separate the satellite from the adapter, which can then accomplish its own mission, whilst the satellite continues its trajectory in the orbit that has in the meantime been reached. If necessary, the adapter that has already been separated from the satellite can be recoupled to it, in order to correct the orbit of the satellite. In addition to its own propulsion system, the adapter is also equipped with means of energy production (such as extendable solar panels, possibly with means of orienting the panels towards the sun) and means of control (in particular computers), and possibly with external structural elements such as extendable radiators to discharge the excess heat generated for example by a payload on board the adapter.

Consequently, in the embodiments according to the two aforementioned European Patents, the adapter is equipped and fitted out as an autonomous, independent space vehicle, with a structure that can be substantially as complex and costly as that of the satellite.

For the implementation of the method of launching into operational orbit according to this disclosure and as defined above, a further subject of this disclosure is a propulsion device contrived from a launcher-satellite interface adapter, allowing for the intermediate orbit to be reached from the point of injection into the transfer orbit, for a reasonable mass and cost.

To this end, the propulsion device according to this disclosure, for the implementation of the method of launching into operational orbit set out above, is controlled by the satellite and comprises a launcher-satellite interface adapter, with which are associated:

- at least two tanks, at least one of which contains a fuel propellant and at least one other of which contains an oxidizer propellant,
- at least one pressurisation tank for at least one propellant,
- at least one apogee thruster,
- manifolds to supply said apogee thruster with propellants from the tanks and, preferably,
- means of thermal protection and thermal control components This propulsion device is therefore arranged as a jettisonable auxiliary propulsion stage of the satellite, and is therefore neither an autonomous propulsion stage, unlike in the teachings of the two aforementioned European Patents, nor a stage of the launcher, as it is not governed by the launcher and is directly controlled by the satellite.

Spherical, cylindro-spherical or sphero-conical geometries can be used when producing the propellant tanks. However, due to considerations relating to optimizing the space occupied, it is characterized, according to this disclosure, in that at least two of the propellant tanks are toroidal, at least one of which is inside and at least one other of which is outside the adapter. For physical reasons, it may be useful for the toroidal tanks to be slanted relative to each other and each relative to a plane perpendicular to the axis of the adapter.

In this case, for reasons of balance, the two toroidal tanks are advantageously slanted relative to each other in opposite phase, that is, such that the highest point of one corresponds to the lowest point of the other, and vice versa. For physico-chemical reasons, because the melting points of the two propellants are generally different from each other, it is preferable that the said at least one toroidal tank inside the adapter is intended to contain whichever of the fuel and oxidizer propellants has the highest melting point, so that this propellant receives better thermal protection from the sidereal vacuum. This measure saves energy by saving on the operation of a heating system equipping the propellant tank. Furthermore, the toroidal geometry of the propellant tanks lends itself well to the placing, inside a standard conical interface adapter (the large and small bases of which are intended to be separably attached to the launcher and the satellite respectively), of an additional tank, preferably spherical, which is the pressurisation tank containing helium to pressurise the propellant tanks to a sufficient pressure for the expulsion of the propellants into the manifold circuits linking the tanks to the apogee thruster, and allowing for the mixing of the fuel and oxidizer on entry to the thruster, the installation of which inside the adapter is also facilitated by the toroidal geometry of the propellant tanks.

BRIEF DESCRIPTION OF THE DRAWINGS

Further, characteristics and advantages of the invention will become apparent from the description given below as non-limitative examples of embodiments described with reference to the attached drawings in which:

FIG. 1 is a diagram of the trajectory followed by the satellite to reach its operational orbit, FIG. 2 is a partial diagrammatic side elevation of a satellite mounted on the last stage of a launcher (rocket) by means of a conical interface adapter arranged as a slave propulsion device of the satellite;

FIG. 3 is a diagram of a propulsion system on board the adapter in FIG. 2;

FIG. 4 is a diagrammatic axial cross-sectional view of an advantageous arrangement of two toroidal propellant tanks on the conical adapter in FIG. 2, and FIG. 5 is a diagrammatic axial cross-sectional view showing the two toroidal tanks in FIG. 4 in an advantageous arrangement slanted in relation to each other.

DETAILED DESCRIPTION OF THE DISCLOSURE

After the production of a propulsion device 1, arranged as a jettisonable auxiliary propulsion stage of the satellite 3 and controlled by it, through the arrangement of a conical interface adapter 2, as described below with reference to FIGS. 3 to 5, the satellite 3, equipped with its own propulsion system, is separably fixed, by a releasable coupling mechanism, to the small basis 4 (in the upper position) of the adapter 2, itself separably fixed, by its large basis 5, by another releasable coupling, to the upper end of the last stage (or upper stage) of a space launcher 6.

At the end of the first propelled phase carried out by the launcher 6, at point A in FIG. 1, the separation occurs, at the large basis 5 of the adapter 2, of the assembly made up of the satellite 3 and the propulsion device 1, on the one hand, and the upper stage of the launcher 6, on the other hand, after the injection by the launcher 6 of the satellite 3-propulsion device 1 assembly into an elliptical transfer orbit 7. This transfer orbit 7 is traveled along, during the ballistic phase, to the zone of point B in FIG. 1, where in a second propelled phase performed by the propulsion device 1, under the complete control of the electronic control circuits on the satellite 3, the circularization of the satellite 3-propulsion device 1 assembly takes place in a circular intermediate orbit 8, whilst the upper stage of the launcher 6 is placed in a graveyard orbit in this transfer orbit 7.

The transition to the intermediate circular orbit 8 (between the transfer orbit 7 and the operational orbit 9) is controlled by the attitude measurement and control instruments of the satellite 3, which command the propulsion device 1 to produce successive thrusts. Normally, if the satellite 3-propulsion device 1 assembly is correctly optimised, all of the propellants in the propulsion device 1 will have been consumed when the satellite 3-propulsion device 1 assembly has reached the intermediate orbit 8. The propulsion device 1 then constitutes a dead weight that can hinder the satellite 3 in its operational life. The satellite 3 then controls the separation of itself and the propulsion device 1, which remains in the intermediate orbit 8, which acts as a graveyard orbit for it, for which reason the intermediate orbit 8 is chosen, for example, 300 km above the operational orbit 9, which is for example a geostationary orbit.

Before or after the separation of the satellite 3 and the propulsion device 1, the latter is rendered passive, mainly through the draining of its fluids, in particular left-over propellant, to avoid any risk of explosion in orbit and/or any risk of unplanned ejection of left-over propellant that might bring the propulsion device 1 closer to the operational orbit 9

Then, using its own propulsion system, delivering one or more successive thrusts, the satellite 3 transfers from the intermediate orbit 8 to its circular operational orbit 9. In this example, in which the intermediate orbit 8 is near to and above the geostationary orbit 9, but sufficiently far away from it to avoid any interference with it and to act as a graveyard orbit for the propulsion device 1, the satellite's 3 own propulsion system delivers one or more successive back-thrusts.

An advantage of this method of launching into operational orbit is that the jettisoning of the propulsion device 1 into the intermediate orbit 8 also allows for a unique design of the satellite 3, whether the launch by the launcher 6 is practically direct, as known in the state of the art, or obtained by means of the propulsion device 1.

The method described above for a circular operational orbit that is geostationary 9, applies equally to the circular orbits known as MEOs (Middle Earth Orbits) between approximately 20,000 and 25,000 km in altitude, which are used for the navigation satellite constellations (GPS, Glonass, Galileo) or the low orbits, in order not to pollute protected zones with space debris.

The propulsion device 1 necessary for the implementation of this method is produced by means of an interface adapter 2 between the launcher 6 and the satellite 3 (see FIG. 2). This adapter 2 incorporates a propulsion system that allows for the performance of propulsive manoeuvres conveying the assembly made up of the satellite 3 and the propulsion device 1 into the intermediate orbit 8. Said propulsion system is fully controlled by the satellite 3, which avoids duplicating the equipment necessary for the performance of propulsive manoeuvres in the adapter 2 by reusing the equipment already present in the satellite 3, unlike what is necessary according to EP 1 313 643 and EP 1 492 706, the subject of both of which is rendering the adapter autonomous by fitting it with equipment to this end.

The interface adapter 2 can be, but is not necessarily, of a standard conical shape of which the large 5 and small 4 bases are intended to be separably attached to the launcher 6 and the satellite 3 respectively, as mentioned above.

The propulsion system comprises in the example in FIG. 3:
two tanks, one of which 10 contains a fuel propellant and the other of which 11 contains an oxidizer propellant,
a helium tank 12 for the pressurisation of the two propellants, such pressurisation tank 12 being spherical,
an apogee thruster 13,
manifolds 14 to supply the apogee thruster 13 with propellant from the tanks 10 and 11, and pressurisation manifolds 15 connecting the helium tank 12 to the propellant tanks 10 and 11, to provide sufficient pressure for the expulsion of the propellants into the manifolds 14 and for the mixing of the fuel and oxidizer on entry to the thruster 13.

Preferably, the propulsion system also comprises means of thermal protection and thermal control components (not shown) such as heaters and protective multi-layer insulation in order to ensure the temperature conditions necessary for the correct operation of the propulsion system.

The propellant tanks 10, 11 can be of various shapes such as spherical, cylindro-spherical (FIG. 3), ellipsoid, etc., which can be placed inside or outside the interface adapter 2. In order to optimise the space occupied by the propulsion device 1, the (at least) two propellant tanks are advantageously toroidal, at least one 10' being placed inside the interface adapter 2, and at least another 11' outside the interface adapter 2 (FIG. 4). This configuration also allows for space to be freed up inside the adapter 2 in order to house advantageously therein the (at least one) pressurisation tank 12 and the manifolds 15, 14, together with the thruster 13.

In order to facilitate the transfer of the propellants, the toroidal tanks 10' and 11' can also advantageously be slightly slanted, typically by a few degrees, relative to each other and each relative to a plane P perpendicular to the axis AA of the adapter 2 (FIG. 5). The slants, i1 and i2 respectively, of each of the two toroidal tanks 10' and 11' are advantageously, for reasons of mechanical balance, in opposite phase; that is, one of the tanks in each pair of two tanks such as 10' and 11' has a positive slant relative to the plane P perpendicular to the axis AA of the adapter 2 and the other has a negative slant relative to the same plane.

As the two propellants, oxidizer and fuel, generally have melting points at different temperatures, it is preferable to place the toroidal tank 10' containing the propellant with the highest melting point inside the adapter 2 as it will receive better thermal protection from the sidereal vacuum and will therefore save on the energy necessary for the heating system.

The invention claimed is:

1. A method of launching a satellite into an operational orbit from a transfer orbit obtained by means of a space launcher, the satellite comprising a satellite propulsion system, compatible with launchers available on market which are not capable of direct launching into operational orbit, the method comprising:
   a) connecting the satellite to a separate propulsion device being controlled by the satellite and mounting the satellite and the separate propulsion device onto the space launcher and launching the satellite, separate propulsion device and space launcher into the transfer orbit,
   b) conveying the satellite and separate propulsion device, by means of the propulsion device, from the transfer orbit into an intermediate orbit, the intermediate orbit being close to the operational orbit but sufficiently far away from the operational orbit to avoid any interference with the operational orbit,
   c) separating the satellite from the separate propulsion device, which remains in the intermediate orbit as a graveyard orbit for the propulsion device, and
   d) allowing the satellite to reach the operational orbit from the intermediate orbit by means of the satellite propulsion system.

2. A method according to claim 1, wherein the transition from the intermediate orbit to the operational orbit is made by means of at least one thrust, delivered by the satellite propulsion system.

3. A method according to claim 1, also comprising a stage of rendering the separate propulsion device passive in the intermediate orbit, before or after separation of the separate propulsion device from the satellite.

4. A method according to claim 1, wherein the operational orbit is a geostationary orbit, and the intermediate orbit is a so-called graveyard orbit, at an altitude several tens to several hundreds of kilometres away from the geostationary orbit.

5. A method according to claim 1, wherein the operational orbit is an orbit known as a MEO, at an altitude of around 20,000 km, and the intermediate orbit is a so-called graveyard orbit, at an altitude several tens to several hundreds of kilometres away from the MEO.

6. Propulsion device, for the implementation of a method of launching a satellite into operational orbit from a transfer orbit obtained by means of a space launcher, the satellite comprising a satellite propulsion system, the method being compatible with launchers available on market which are not capable of direct launching into operational orbit, the method comprising at least the following stages:

a) attaching a separate propulsion device to the satellite and mounting the satellite and the separate propulsion device onto the space launcher before injection of the satellite, separate propulsion devices and space launcher into the transfer orbit by the means of the space launcher and separating the space launcher from the satellite and separate propulsion device, b) conveying the satellite and separate propulsion device, by means of the separate propulsion device, from the transfer orbit into an intermediate orbit, the intermediate orbit being close to the operational orbit but sufficiently far away from the operational orbit to avoid any interference with the operational orbit, c) separating the satellite from the separate propulsion device, which remains in the intermediate orbit as a graveyard orbit for the propulsion device, and d) allowing the satellite to reaches the operational orbit from the intermediate orbit by means of the satellite propulsion system, the separate propulsion device being controlled by the satellite and the separate propulsion device comprising a launcher satellite interface adapter, at least two tanks at least one of which contains a fuel propellant and at least one other of which contains an oxidizer propellant, at least one pressurisation tank for at least one propellant, at least one apogee thruster, manifolds to supply the apogee thruster with propellants from the tanks, wherein at least two of the tanks of propellant are toroidal tanks, at least one of which is inside and at least one other of which is outside the adapter.

7. Device according to claim 6, wherein the toroidal tanks are slanted relative to each other and relative to a plane perpendicular to an axis of the adapter.

8. Device according to claim 7, wherein the two toroidal tanks are slanted relative to each other in opposite phase.

9. Device according to claim 6, wherein the at least one toroidal tank inside the adapter is intended to contain whichever of the fuel and oxidizer propellants has the highest melting point.

10. Device according to claim 6, wherein the interface adapter is of a standard conical shape, having a large and a small bases which are intended to be separably attached to the launcher and the satellite respectively.

* * * * *